United States Patent
Novotny et al.

(10) Patent No.: US 6,483,801 B1
(45) Date of Patent: Nov. 19, 2002

(54) OPTICAL STORAGE DEVICES WITHOUT MASS TRANSFER AND SPOTS

(75) Inventors: Vlad Novotny, Los Gatos, CA (US); Roger A. Hajjar, San Jose, CA (US)

(73) Assignee: Terastor Corporation, Milpitas, CA (US)

( * ) Notice: Subject to any disclaimer, the term of this patent is extended or adjusted under 35 U.S.C. 154(b) by 34 days.

(21) Appl. No.: 09/575,717

(22) Filed: Jul. 31, 2000

(51) Int. Cl.$^7$ .................................................. G11B 7/00
(52) U.S. Cl. ...................................................... 369/300
(58) Field of Search ........................... 369/300, 275.5, 369/283, 284, 285, 286, 275.1, 275.3, 275.2, 100, 109

(56) References Cited

U.S. PATENT DOCUMENTS

| | | | | |
|---|---|---|---|---|
| 4,360,908 A | * | 11/1982 | Howe et al. ............. 369/275.1 |
| 5,153,873 A | * | 10/1992 | Spruit et al. ................. 369/100 |
| 5,323,372 A | * | 6/1994 | Puech et al. .............. 369/275.2 |
| 6,115,344 A | * | 9/2000 | Gudesen et al. ............ 369/100 |

* cited by examiner

Primary Examiner—Allen Cao
(74) Attorney, Agent, or Firm—Fish & Richardson P.C.

(57) ABSTRACT

Techniques and medium structures for reducing signal distortions due to mass transfer from the medium surface to the optical head in optical storage devices in both far-field and near-field configurations. In one embodiment, a transparent capping layer is formed on a storage medium to have a sufficient thickness so that a beam spot size of an optical beam on the medium surface is sufficiently large to make a power density of the beam less than a threshold power density for mass transfer from the medium to the optical head.

34 Claims, 5 Drawing Sheets

Demonstrated Spotless Media

FFR First Surface Media Types

*Phase Change- Single Layer*

FIG. 6A

*MO Single Layer*

FIG. 6B

*Phase Change- Double Layer*

FIG. 6C

*MO Double Layer*

FIG. 6D

OPTICAL STORAGE DEVICES WITHOUT MASS TRANSFER AND SPOTS

BACKGROUND OF INVENTION

This disclosure relates to data storage, and more particularly to an optical data storage system that reads and writes data by coupling optical radiation energy to and from a storage medium.

Optical storage systems can achieve high areal density data storage by using a tightly-focused laser beam to write or read information to and from a suitable storage medium, e.g., an optical disk. An optical storage system typically uses an optical head with a large numerical aperture to focus a monochromatic optical beam to a small spot on a recording layer in the storage medium. The optical head also collects the reflected optical beam from the medium to extract useful control or data signals.

The design and performance of the optical head and the storage medium can be critical to the performance of the storage system, including data recording, data retrieval, and beam tracking.

SUMMARY OF INVENTION

The systems and methods of this disclosure are in part based the recognition that particles can transfer from the medium surface to the optical head due to heating of the medium surface by the focused optical beam. Such mass transfer can contaminate the optical head and hence can cause signal distortions in many optical disk drives in both the far-field configuration where the optical head and the medium are spaced greater than one wavelength of the radiation and the near-field configuration where the optical head and the medium are spaced less than one wavelength of the radiation. In the far-field configuration, the light is coupled between the head and the storage medium by light propagation. In the near-field configuration, at least a portion of the light coupling is through evanescent fields.

It has been discovered that the mass transfer due to the heating of the medium surface by the focused optical beam exhibits a threshold behavior. The effects of the mass transfer become significant to distort the optical signals and to cause potential damages to the optical head when the optical power density on the medium surface is above a particular threshold value. Hence, the storage medium may be structured to allow sufficient optical power density to reach the storage layer for writing and reading while keeping the optical power density at the medium surface below that threshold power density. This can substantially reduce the adverse effects of the mass transfer. When different mass transfer processes are present in an optical storage system and have different threshold power densities, the medium may be structured to keep the optical power density at the surface below the smallest threshold power density.

An optical storage device according to one embodiment includes a storage medium which has a data storage layer formed on a substrate to interact with radiation energy coupled from an optical head. A transparent capping layer is formed over the data storage layer to have a first surface facing the data storage layer and a second surface opposing the first surface to receive the radiation energy from the optical head. The transparent capping layer is operable to transmit a convergent beam of the radiation energy to focus on or near the data storage layer.

The thickness of the capping layer is set to allow a sufficient spacing between the second surface and the data storage layer so that a beam spot size of the convergent beam on the second surface is sufficiently large to make a power density of the radiation beam on the second surface less than a threshold power density for mass transfer from the medium to the optical head.

These and other embodiments and associated advantages of the present disclosure are set forth in the accompanying drawings and the description below.

BRIEF DESCRIPTION OF DRAWINGS

FIG. 1A shows an optical storage system having an optical head and a storage medium.

FIG. 1B shows one implementation of the system in FIG. 1A where the optical head includes solid immersion lens.

FIG. 2 show measured probability of spot formation and signal-to-noise ratio of two different types of medium structures.

FIG. 3 shows one implementation of the system in FIG. 1B where the medium has a thick transparent capping layer to reduce mass transfer from the medium surface to the optical head.

FIGS. 4, 5A through 5D, 6A through 6D, and 7 show examples of different medium structures that reduce the mass transfer.

DETAILED DESCRIPTION

An optical head in both far-field and near-field optical data storage systems has an optical interfacing surface to couple radiation energy to and from the storage medium. This optical interfacing surface is transparent and faces the medium surface. The radiation energy from the optical head is focused onto at least one storage layer in the medium. Absorption of the light in the medium can cause localized heating at and near the focused spot in the medium, on the medium surface where the beam intercepts, and on the interfacing surface on the optical head.

It is discovered that, the heating on the medium surface and the interfacing surface of the optical head can cause undesired deposition of certain substances on the interfacing surface of the optical head. Such deposited substances on the interfacing surface contaminate the interfacing surface of the optical head and can cause adverse signal distortions on the signals carried by the reflected optical beam from the medium. These signals include, for example, a tracking error signal, an alignment error signal, a read-only signal, a data-bearing signal (e.g., a magneto-optic signal or a phase change signal), a writing signal, and other signals. The signal distortions on these signals can lead to various operational problems when the distortion exceeds some acceptable tolerance level, such as erroneous data readout, loss of data, track misregistration, error in beam alignment, reduced signal-to-noise ratio, and even malfunction of the system. A near-field system is particularly prone to such contamination since the interfacing surface of the optical head is spaced from the medium surface of the storage medium by less than one wavelength of the radiation energy during normal operation to couple at least part of the energy via evanescent fields.

Different processes may contribute to the mass transfer from the optically-heated medium surface to the optical head in both the near-field and the far-field systems. One process involves the transfer of single molecules adhered to the medium surface due to absorption of the optical energy by the transferred molecules. When the optical power density on the medium surface is above the respective threshold value, a molecule can gain a sufficient amount of thermal kinetic energy to overcome the surface-binding force and to become desorbed from the medium surface. This adsorbed molecule can transfer and adsorb to the interfacing surface of the optical head to cause contamination.

Notably, this type of mass transfer is in general reversible because the molecules adsorbed to the optical head can become desorbed again. Different species of molecules may become desorbed at different optical power densities. Examples of various molecules for such reversible mass transfer include molecules of water, polymer, carbon, hydrocarbon, and others. One way to reduce or eliminate the effects of such mass transfer is to heat the interfacing surface of the optical head. U.S. Pat. No. 6,069,853 to Novotny et al.

Another example of different mass transfer processes is the transfer of cluster of molecules due to the localized optical heating of the medium surface by the focused optical beam. The surface binding force for the molecule clusters is generally greater than that of the single molecules. Thus, direct optical absorption by the molecule clusters often may not be sufficient to cause desorption. The molecules clusters need to gain sufficient thermal kinetic energy from the heated medium surface which is usually heated by an optical power density higher than the threshold value for the mass transfer of single molecules. Examples of transferred materials found in such irreversible transfer include various metals (e.g., Fe, Au, Al) and other large particles Different from the reversible transfer of single molecules, this mass transfer is usually irreversible so that when the molecule clusters are transferred onto the interfacing surface of the optical head, "spots" are formed. Such spots may be formed even when the molecule clusters do not directly absorb light as long as the medium surface is heated to a sufficiently high temperature by the optical beam at or above the threshold power density. Such spots can cause permanent damages to the optical head if not removed. One way of removing such spots on the optical head is to cause the interfacing surface of the optical head to contact another surface, e.g., a cleaning pad or the medium surface, when cleaning is desirable. See, e.g., the pending U.S. patent application Ser. No. 09/304,527 by Novotny.

It is recognized that the problems associated with the mass transfer from the medium surface may be solved by preventing the mass transfer. Remedial techniques to reduce the effects of the mass transfer can be used to supplement the prevention technique. According to one embodiment, the storage medium may be structured to include a thick capping layer over the storage layer which keeps the medium surface sufficiently away from the storage medium where the optical beam is focused so that the beam spot size on the medium surface is sufficiently large and the optical power density at the medium surface below the minimum threshold power density for the mass transfer. Hence, when both the reversible and irreversible processes are present, the optical power should be maintained below the threshold value associated with the reversible process.

Figure 1A:
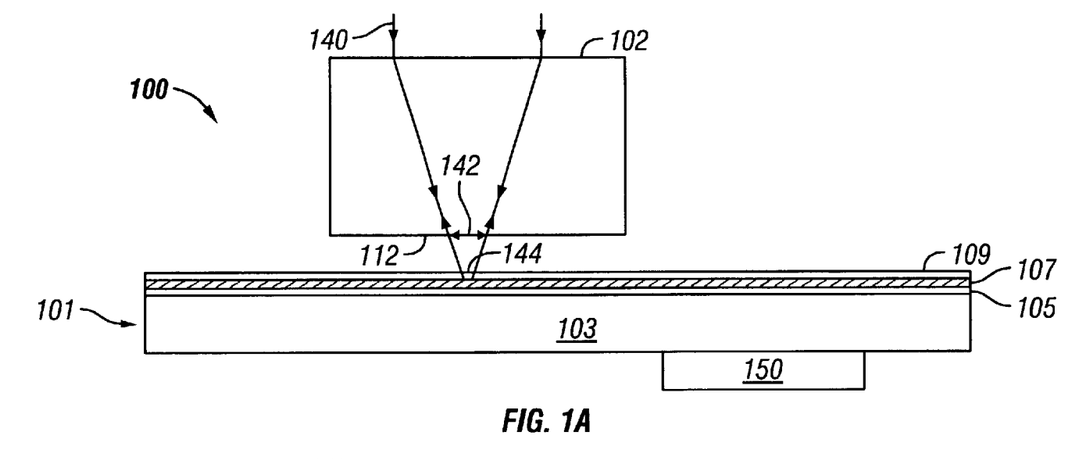

FIG. 1A shows an optical data storage system 100 having an optical head 102 and a storage medium 101 which is held by a medium holder device 150. The optical head 102 in general includes at least one lens and can operate in either the near-field or the far-field configuration. An optically-transparent surface 112 on the bottom of the optical head 102 functions as the interfacing surface to interact with the medium 101 by coupling an optical beam 140.

The storage medium 101 may be a disk which includes, among others, at least a top protection layer 109, a storage layer 107, and a reflective layer 105 under the storage layer 107 formed on one side of a substrate 103. The storage layer 107 can respond to the optical bean to either store a data bit or to modulate the beam to output a data bit depending on the mode of operation of the system. Examples of the storage layer 107 include a magneto-opto layer or a phase change layer. The optical head 102 couples an optical beam 140 to the storage layer 107 through the top protection layer 109 and receives reflected beam from the medium 101.

Figure 1B:
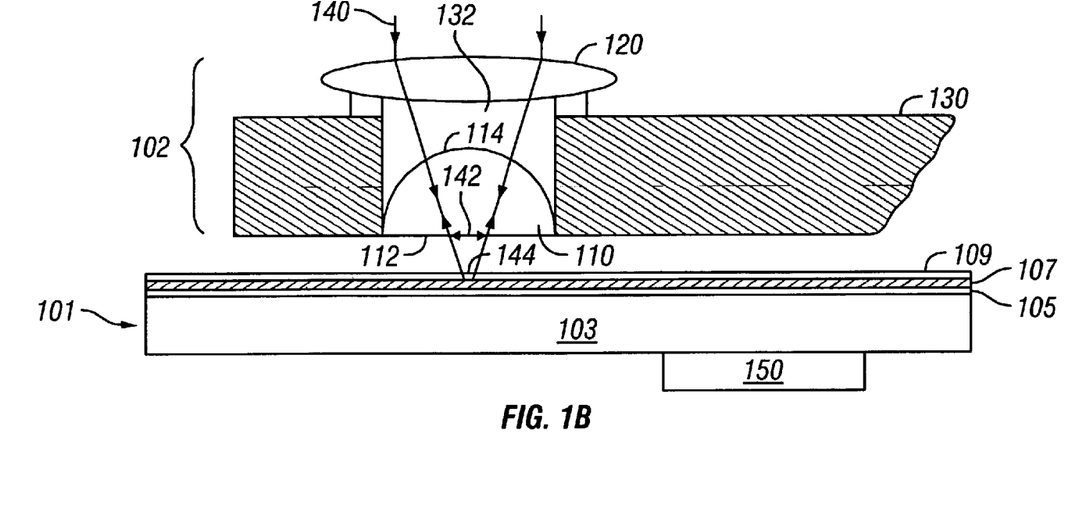

FIG. 1B shows one embodiment of the optical head 102 implementing a solid immersion lens 110 and an objective lens 120 to couple the optical energy. A substrate 130 is used to form a slider which has a through hole 132 to place the solid immersion lens 110 and to provide a clear path for transmitting the optical beam 140. The objective lens 120 is engaged to the slider 130 with a fixed spacing from the lens 110. The solid immersion lens 110 is formed of a high-index material and has a spherical surface 114 facing the objective lens 120 and a flat surface 112 facing the top protection layer 109 of the medium 101. The flat surface 112 generally functions as the interfacing surface to couple the optical energy. This design of the optical head 102 can operate in the near-field configuration where the optical head 102 is spaced from the top protection layer 109 by less than one wavelength of the beam 140 so that the energy of the internally totally reflected rays can be coupled to the medium 101 through the air gap between the head 102 and the medium 101. The lens 110 can be a hemispherical lens where the spacing between the flat surface 112 and the apex of the spherical surface 113 is about the radius of the spherical surface 114, or a super hemispherical lens where the spacing between the flat surface 112 and the apex of the spherical surface 113 is greater than the radius of the spherical surface 114.

However constructed, the optical head 102 couples the optical beam 140 to intercept with the interfacing surface 112 and to form a first beam spot 142. The beam 140 then passes through the air gap and intercepts with the top protection layer 109 of the medium 101 to form a second beam spot 144. Some of the particles or other species adhered to the medium surface (i.e., the top protection layer 109) in the beam spot 144 can either absorb the light or obtain thermal energy from the heated medium surface. When the light intensity at the spot 144 is sufficiently high, the thermal kinetic energy of the particles can become equal to or greater than the binding energy of the surface. Hence, such particles can be desorbed from the medium surface and transferred to the interfacing surface 112 of the optical head 102. When the flat surface 112 is only spaced away from the medium surface by less than one wavelength in the near-field configuration, the rate of transferring desorbed particles is higher than the transfer rate when the system is in the far-field configuration.

This mass transfer from the medium surface due to light absorption can be a major contributor to the aforementioned particle deposition on the optical head 102. The adhered particles can form spots on the flat surface 112 and distort the signals in the optical beam coupled between the optical head 102 and the medium 101.

Various measurements and experiments have shown that, the above signal distortions have relatively sensitive dependence on the intensity or energy density of the optical beam at the interfacing surface of the head or at the medium surface. In general, as the optical power density increases, the degree of such a signal distortion increases. This power density dependence of the distortion also exhibits a threshold behavior: the distortion, although gradually increasing with the optical power density, remains small below the acceptable tolerance level when the optical power density is below a threshold value; the distortion increases significantly with the optical power density well above the acceptable tolerance level when the optical power density exceeds the threshold.

Figure 2:
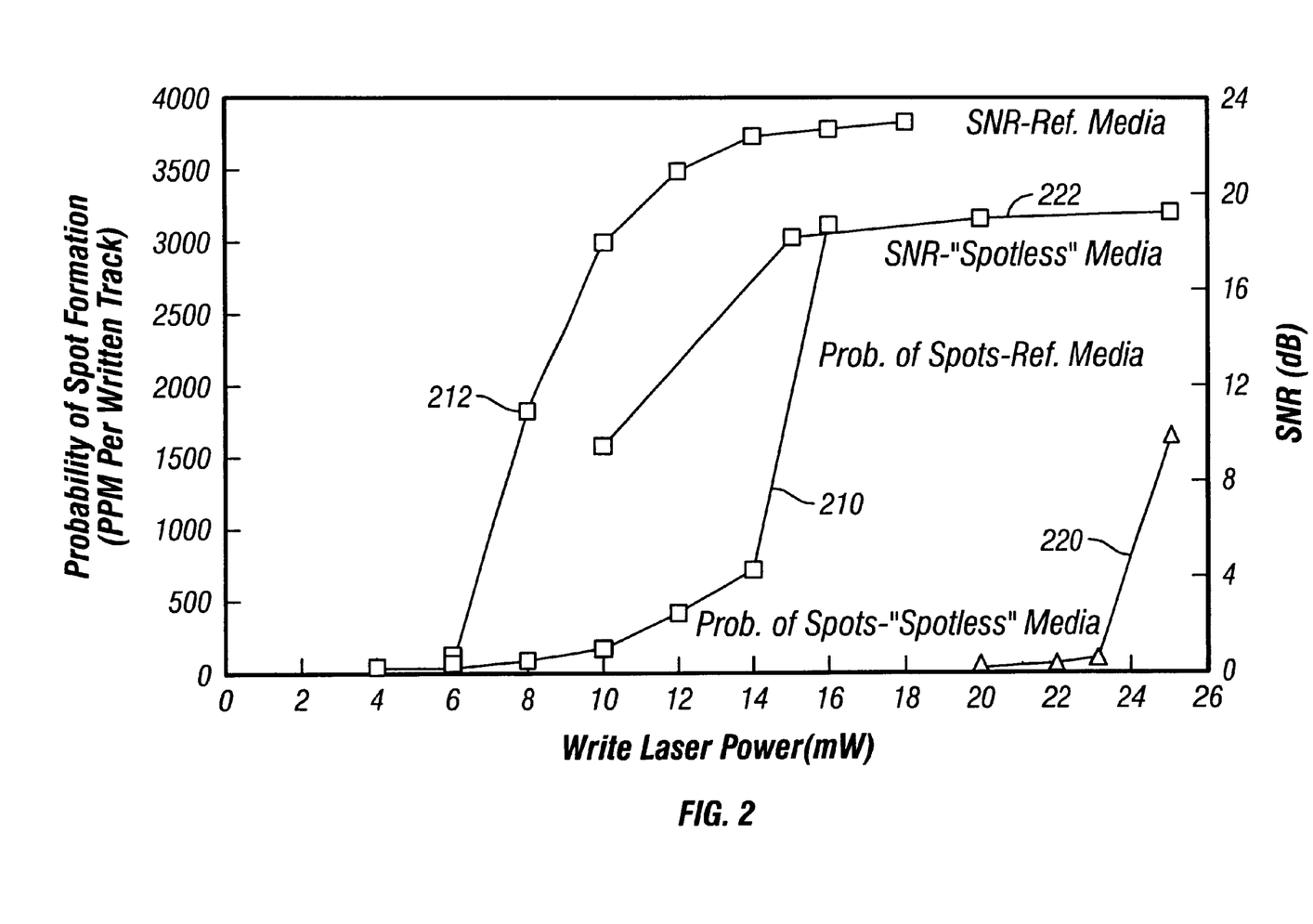

FIG. 2 shows the measured probability data of spot formation on the optical head 102 as a function of the laser power on the medium surface in a near-field optical system similar to the system 100 for two different types of media. The curve 210 represents data measured from a near-field medium whose structure is not specifically designed to reduce the optical power density on the medium surface during normal operation.

Referring back to the medium structure 101 in FIGS. 1A and 1B, in such a medium, the top protection layer 109 is less than about 0.3 micron in thickness and includes a top carbon layer and a Si3N4 layer formed over a magneto-optic layer. The reflective layer 105 includes a layer of Au on the top and a layer of Ti on the bottom and directly formed over the substrate 103. The data points in curve 210 indicate that the threshold power for the spot formation on the optical head is about 4 mW. The beam spot size on medium surface is less than about 0.8 micron. Since the recording layer 107 underneath the protection layer 109 is close to the medium surface and the incident beam coupled from the optical head 102 is focused on or near the storage layer 107, the beam spot size on the medium surface is relatively small by virtue of being adjacent to the storage layer 107. Hence, the power density at the medium surface is relatively high and leads to a high probability of spot formation.

The curve 220 of FIG. 2 represents data measured from a specially designed medium with a thick capping layer configured to reduce the optical power density on the medium surface during normal operation according to one embodiment. The transparent thick capping layer is added to space the medium surface from the recording layer 107 so that the beam spot size on the medium surface is sufficiently large to reduce the surface power density below the threshold power density while maintaining a minimum acceptable power level in the beam for a desired read or write operation. The minimum acceptable power level varies with the media. If the medium is a read-only medium, the acceptable power is set to achieve a desired signal-to-noise ratio. If the medium is a writable medium, this acceptable power should be at the minimum power required for writing data on the storage layer with a desired signal-to-noise ratio since the writing power is usually higher than the reading power. FIG. 2 further shows the measured signal-to-noise ratio curves 212 and 222 measured from the two different types of media.

Figure 3:
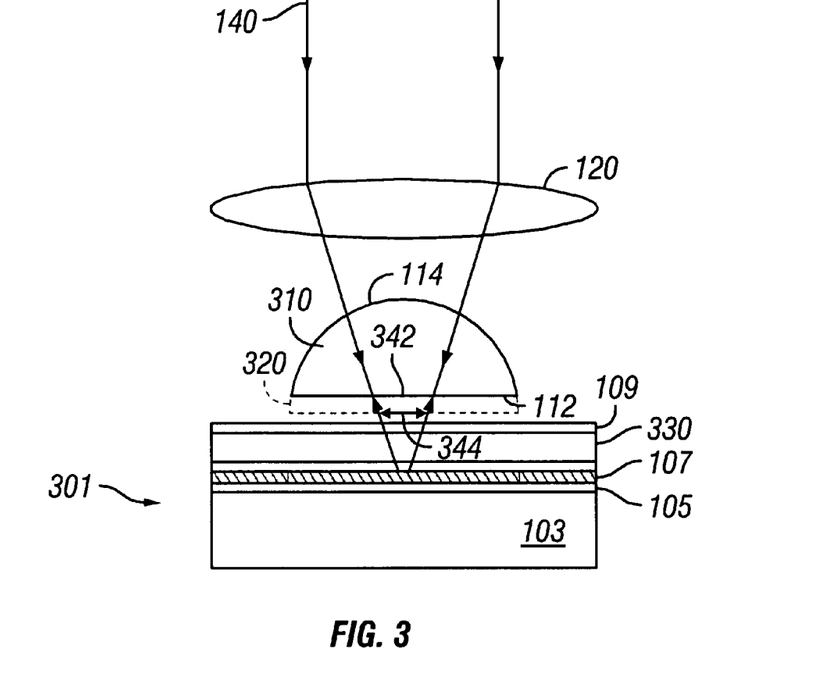

FIG. 3 illustrates a modified system 300 which has a modified solid immersion lens 310 and a modified "spotless" medium 301. A thick transparent capping layer 330 is added between the top protection layer 109 and the storage layer 107. Hence, the medium surface 108 is spaced away from the storage layer 107 by at least the thickness of the transparent capping layer 300. The modified solid immersion lens 310 is the lens 110 with a bottom portion 320 removed. The distance between the flat surface 112 and the apex of the spherical surface 114 of the solid immersion lens 110 is reduced. The thickness of the removed portion 320 is an amount associated with the characteristics of the added transparent layer 330 so that the input beam is still focused on or near the storage layer 107 in the modified system 300. This increases the beam spot size 344 on the medium surface 108 in comparison of the medium 101 in the system 100 without the transparent layer 330. The spacing between the flat surface 112 of the modified solid immersion lens 310 and the medium surface 108 remains in the near-field configuration, i.e., less than one wavelength apart from each other, to allow for evanescent coupling. FIG. 3B shows the optical head 110 and the medium 101 of the system 100 for comparison.

The modification shown in the system 300 may be considered as transferring a portion 320 of solid immersion lens 110 to the medium 101 and shifting the position of the air gap. Hence, the transparent layer 330 in the medium 301 now optically functions as part of the lens 110 in the system 100. The distance between the flat surface 112 and the apex of the spherical surface of the modified lens 310 (or equivalently the thickness of the removed portion 320) and the thickness and properties of the transparent capping layer 330 are related based on the minimum threshold power density for signal distortion due to the mass transfer.

The threshold power density is first determined based on the structure of the modified medium 301. Then, based on the desired signal-to-noise ratio, the corresponding threshold power at the medium surface 108 is determined. Next, the minimum beam spot size on the medium surface 108 corresponding to the threshold power and the threshold power density can be calculated. The desired beam spot size is usually chosen to be greater than the minimum spot size to achieve a safety margin.

In addition to the above effect of increasing the distance between the medium surface 108 and the storage layer 107, the thick transparent capping layer 330 can also provide thermal insulation to reduce the conduction of the heat generated in the storage layer 107 by optical absorption to the medium surface 108. This function of the layer 330 can increase the threshold intensity and hence the corresponding threshold power. It is therefore desirable to use a low thermal conductive material for the layer 330 if possible. The thermal conductive property of the transparent layer 330 may be characterized by a ratio between its thickness and the respective thermal conductivity. In general, this ratio should be sufficiently large to provide desired thermal insulation. For example, a suitable thickness-to-conductivity ratio may be greater than about 103 nm·(J/cm·s·°C.)–11, and preferably greater than about 2×103 nm·(J/cm·s·°C.)–1, and more preferably greater than 14×103 nm·(J/cm·s·°C.)–11.

The above ratio may be modified to include the effect of optical absorption by multiplying the inverse of the absorption coefficient of the layer 330. The dielectric constant of the layer 330 can be generally expressed as (ik+n) where the imaginary part k is the extinction coefficient representing the optical absorption and n is the index of refraction. It is desirable to have low extinction coefficient k, e.g., less than 10–4, to reduce the amount of heat generated in the layer 330 itself. Since the transparent layer 330 operates as part of the optical head to produce a high numerical aperture, its index n should be as large as possible, e.g., greater than 1.6 or at least greater than the effective numerical aperture of the optical head.

Furthermore, the optical absorption of the top protection layer 109 should be as small as possible to reduce heating at the medium surface. This is to reduce the spot formation since the spots can be formed from desorption of molecule clusters from obtaining energy from the medium surface alone without direct optical absorption. Silicon oxide, silicon nitride, Titanium oxide, polymers and a combination thereof may be used as the top protection layer.

Figure 4:
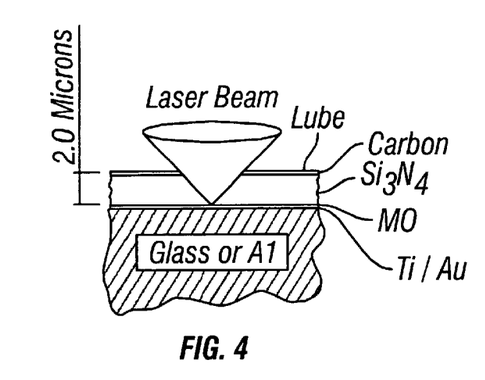

FIG. 4 shows one exemplary medium structure 400 based on the system 300 of FIG. 3. The medium 400 is a modified version of the test medium used to obtain the data curve 210 in FIG. 2. The top 0.2-micron protection layer formed of a top carbon layer and a Si3N4 layer over a magneto-optic layer is replaced with a top carbon layer and a 2-micron Si3N4 layer to decrease the power density on the surface of the top carbon layer. The measured probability of spot formation as a function of the input laser power is shown in curve 220 of FIG. 2. The threshold power for the spot formation is about 20 mW, an increase by a factor of 5 compared to the media without the 2-micron layer. The beam spot size on the medium surface increases by a factor of about 4, from about 0.8 micron to about 4.3 microns.

FIGS. 5A through 5D show four additional examples of modified medium structures based on the basic design shown in FIG. 3. The substrate can be formed of a number of materials, including glasses, metals such as aluminum, or polycarbonate materials. A 2P polymer layer may be formed between the substrate and the reflective layer. These layers may be fabricated by forming polymeric layers based on spin coating, dip coating, blade coating, or evaporation coating. The processing needs to be compatible with the substrate material. For example, when polymeric substrates are used, heating curing should be performed under temperatures that do not cause substrate distortions. When the heating curing is not feasible, UV curing or electron beam curing may be used. Other fabrication options include applying polymeric or glass sheets with thin adhesives or forming dielectric layers by the vacuum deposition.

FIGS. 6A–6D show four examples of disk structures with single and double magneto-optical or phase change layers for far-field optical storage systems. In all the disk structures shown in FIGS. 5, 5A through 5D, and 6A through 6D, the structures with capping layers about or greater than 100 microns in thickness may be used for phase change recording or magneto-optic light intensity modulation recording in both far field or near field configurations. The structures with capping layers about or less than 10 microns in thickness may be used for magnetic modulation recordings, also in both far field or near field configurations.

The capping layer 330 may be formed of a number of transparent materials. Examples include silicon oxide, silicon nitride, titanium oxide, and polymers. A 2P polymer layer can be used to form the capping layer 330.

Figure 5A:
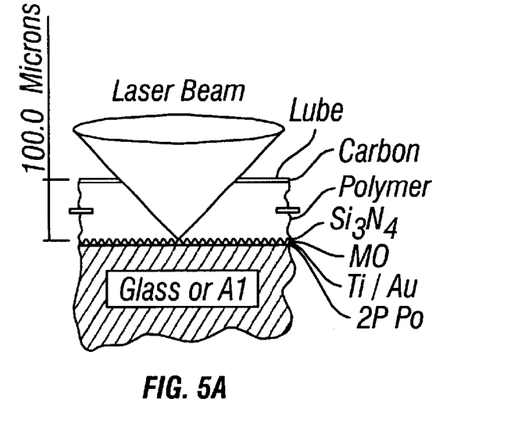
Figure 5B:
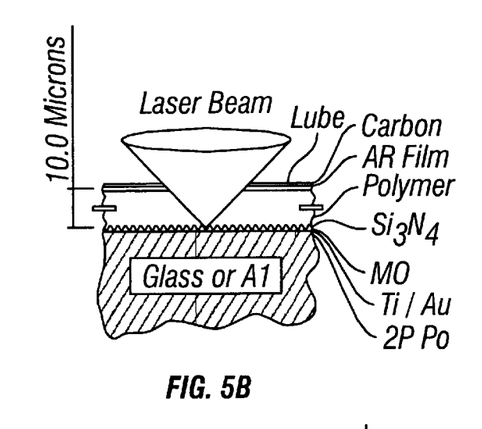
Figure 5C:
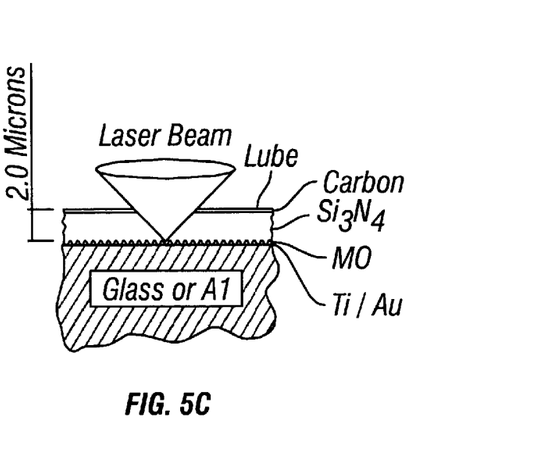
Figure 5D:
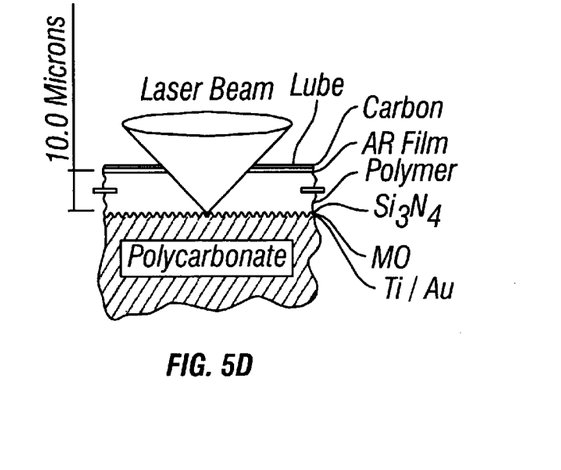
Figure 6A:
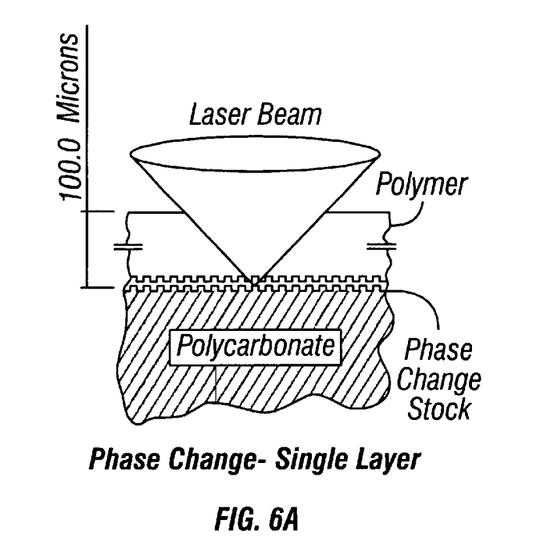
Figure 6B:
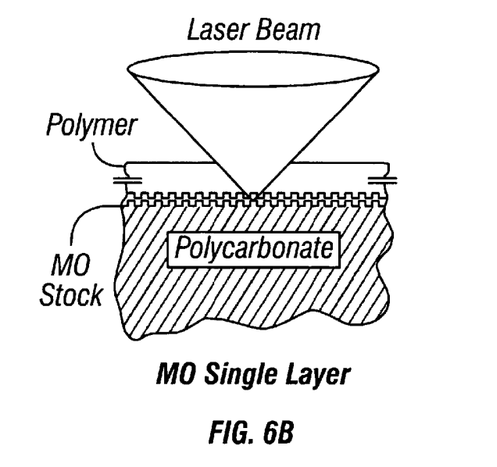
Figure 6C:
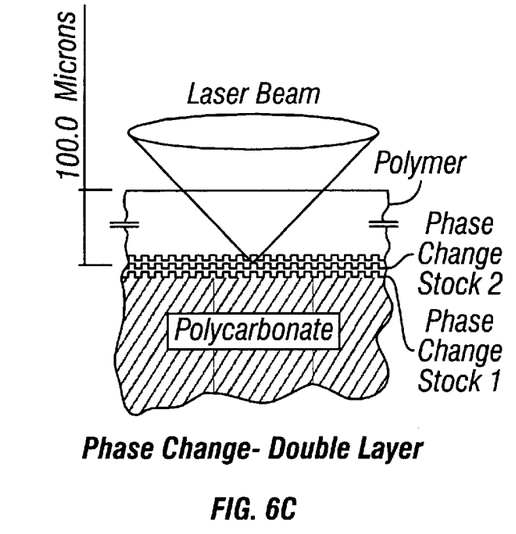
Figure 6D:
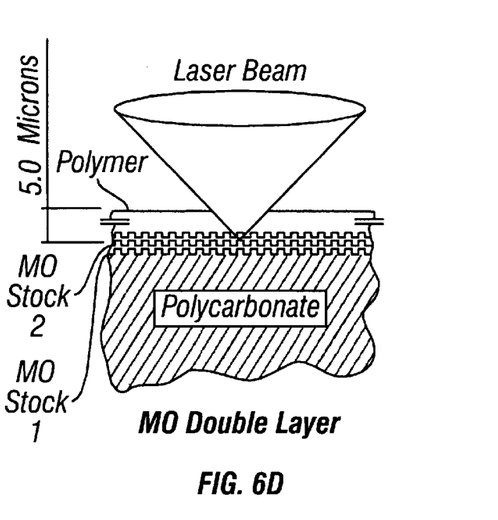

The optical beam in the near-field storage system is coherent. Hence, when the thickness of the capping layer 330 is less than the coherent length of the beam (e.g., about 50 microns for a diode laser), optical interference may occur at the surfaces of the layer 330. This interference can cause undesired modulations in the magnitude and phase of the optical signals. An anti-reflective layer, such as shown in FIGS. 5B and 5D, may be formed on the top surface of the layer 330 under the top carbon protective layer to reduce the interference-caused modulations. In the first approximation, the refractive index of the AR layer is the square root of the index of the layer 330 and the optical thickness of the AR layer is one quarter of the wavelength. Suitable materials for this antireflection layer include MgF2, SiO2, and others.

Referring back to FIG. 1B, the near-field configuration of the optical head 102 may be achieved by "flying" the optical head 102 over the surface 108 of the medium 101 by an air bearing force due to the relative motion between the head 102 and the medium (e.g., using a spinning disk). A portion of the bottom surface of the slider 130 has an air-bearing surface to generate the air bearing action. Hence, the top protection layer 109 should be a flyable surface which is sufficiently smooth. For example, the rms value of the surface roughness should be less than about 0.5 nm on a 100-micron scale and less than about 10 nm on a 1-mm scale.

Figure 7:
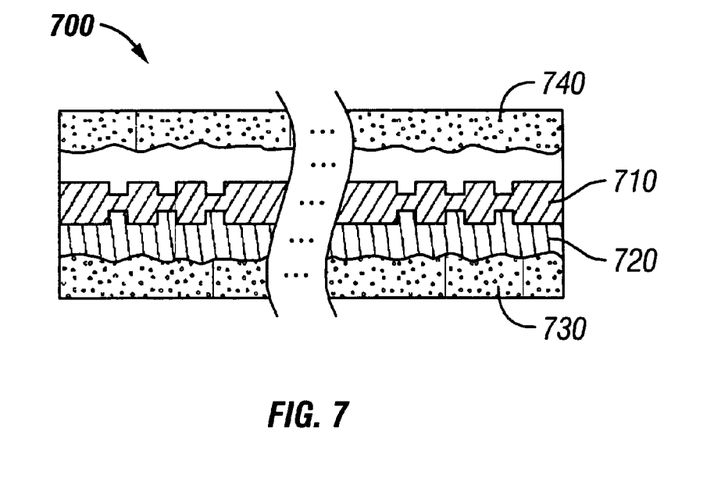

FIG. 7 shows another medium structure designed to have a thick capping layer and to improve flyable medium surface. The disk 700 includes a hard transparent substrate 710 with grooves on both sides. A storage layer 720, which may include a magneto-optic layer or a phase change layer, is formed on the bottom side of the substrate 710. A bottom protection layer 730 covers the storage layer 720. On the top side of the substrate 710 which receives the optical beam from the optical head, a thick capping layer 730 is formed with a thickness to ensure a sufficient spacing between the storage layer 720 and the medium surface on the top of the capping layer 730 to make the optical power density on the top less than the minimum threshold power density for the mass transfer.

Alternatively, the substrate 710 may be made without the grooves. Instead, a polymer layer is formed over the surface of the substrate 710 and is embossed with grooves. Preferably, the polymer layer is formed of a polymer material with a high glass transition temperature so that when the thick capping layer 740 is formed of a polymer, it can be completely processed at a processing temperature lower than the glass transition temperature, without affecting the grooved polymer layer already formed on the substrate 710.

A number of exemplary embodiments have been described. Nevertheless, it will be understood that various modifications and enhancement may be made without departing from the scope of the following claims.

What is claimed is:

1. An optical storage device, comprising a storage medium which includes a substrate, a data storage layer formed on said substrate to interact with radiation energy coupled from an optical head, and a transparent capping layer formed over said data storage layer, having a first surface facing said data storage layer and a second surface opposing said first surface to receive the radiation energy, said transparent capping layer to transmit a convergent beam of the radiation energy to focus on or near said data storage layer, wherein said transparent capping layer has a thickness to allow a sufficient spacing between said second surface and said data storage layer so that a beam spot size of said convergent beam on said second surface is sufficiently large to make a power density of said convergent beam on said second surface less than a threshold power density for mass transfer from said medium to the optical head.

2. The device as in claim 1, further comprising a top protection layer, substantially transparent to said radiation energy, formed over said second surface of said transparent capping layer.

3. The device as in claim 2, wherein said top protection layer includes a material which has carbon.

4. The device as in claim 1, further comprising a reflective layer formed between said data storage layer and said substrate.

5. The device as in claim 4, wherein said reflective layer includes Ti or Au.

6. The device as in claim 4, further comprising a polymer layer formed between said reflective layer and said substrate, wherein said polymer layer is embossed with grooves.

7. The device as in claim 1, wherein said substrate is formed of a metal, a glass, or a polycarbonate.

8. The device as in claim 1, wherein said transparent capping layer includes a polymer material.

9. The device as in claim 1, further comprising a layer of a silicon compound between said transparent capping layer and said substrate and a reflective layer between said layer of silicon compound and said substrate.

10. The device as in claim 1, wherein said transparent capping layer includes silicon nitride or silicon oxide.

11. The device as in claim 1, further comprising an anti-reflection layer formed over said second surface of said transparent layer when said thickness is less than a coherent length of said radiation energy.

12. The device as in claim 1, wherein said transparent layer is formed of a thermal insulation material to reduce a heat conduction from said data storage layer to said second surface.

13. The device as in claim 12, wherein said transparent layer has an extinction coefficient less than about 10–4.

14. The device as in claim 1, wherein said data storage layer includes a magnetooptic material.

15. The device as in claim 1, wherein said data storage layer includes a phase change material.

16. The device as in claim 1, wherein said transparent layer has an index of refraction greater than 1.6.

17. The device as in claim 1, wherein said transparent layer has an index of refraction greater than an effective numerical aperture of the optical head.

18. An optical storage device, comprising:
    an optical head, having an optical surface to couple optical energy;
    an optical storage medium to receive an optical beam of the optical energy from the optical head, said medium including a substrate, a reflective layer formed over said substrate, a storage layer formed over said reflective layer, and a transparent capping layer formed over said storage layer; and a medium holder to hold said medium relative to said optical head which directs the optical beam to transmit through said capping layer to be focused on or near said storage layer and to be reflected back to said optical head,
    wherein said capping layer has a thickness to allow a beam spot size of said optical beam on a medium surface of said medium is sufficiently large to make a power density of said optical beam on the medium surface less than a threshold power density for mass transfer from said medium to said optical head.

19. The device as in claim 18, wherein said optical head and said medium are spaced from each other by less than one wavelength of said optical energy.

20. The device as in claim 18, wherein said optical head includes a solid immersion lens having a spherical surface and a flat surface, said flat surface interfacing said medium.

21. The device as in claim 20, wherein said flat surface is spaced from an apex of said spherical surface by a radius of said spherical surface.

22. The device as in claim 20, wherein said flat surface is spaced from an apex of said spherical surface by a spacing greater than a radius of said spherical surface.

23. The device as in claim 18, wherein said optical head and said medium are spaced from each other by a distance greater than one wavelength of said optical energy.

24. The device as in claim 18, wherein said capping layer has an index of refraction greater than greater than a numerical aperture of said optical head.

25. The device as in claim 18, wherein said capping layer has a thickness-to-thermal conductivity ratio greater than about 103 nm·(J/cm·s·°C.)–1.

26. The device as in claim 18, wherein said optical head includes a slider with an air-bearing surface operable to generate an air bearing force to lift said optical head above said medium.

27. The device as in claim 26, wherein the medium surface has a rms value of the surface roughness less than about 0.5 nm on a 100-micron scale and less than about 10 nm on a 1-mm scale.

28. A method, comprising:
    forming a storage layer over a substrate to interact with an optical beam focused by an optical head to record data therein or to modulate the optical beam to output data;
    forming a capping layer over the storage layer which is substantially transparent to couple the optical beam therethrough onto the storage layer; and
    setting a thickness of the capping layer sufficiently large to space a medium surface facing the optical head from the storage layer so that a beam spot size of the optical beam on the medium surface is sufficiently large to make a power density of the optical beam on the medium surface less than a threshold power density for mass transfer from the medium to the optical head.

29. The method as in claim 28, wherein the mass transfer include contributions from two or more different transfer processes which occur at different threshold power densities on the medium surface, and the power density of the optical beam on the medium surface is less than the smallest threshold power density.

30. The method as in claim 28, wherein the capping layer is formed of a polymer material.

31. The method as in claim 28, wherein the storage layer interacts with the optical beam through a phase change or magneto-optic light intensity modulation recording in both far field or near field configurations.

32. The method as in claim 28, wherein the storage layer interacts with the optical beam through magnetic modulation recordings in both far field or near field configurations.

33. The method as in claim 28, further comprising placing the optical head away from the medium surface by less than one wavelength of the optical beam to couple the energy of the optical beam to the storage layer at least in part by evanescent fields.

34. The method as in claim 28, further comprising placing the optical head away from the medium surface by a distance greater than one wavelength of the optical beam to couple the energy of the optical beam to the storage layer through light propagation only.

* * * * *